(12) United States Patent
Rao

(10) Patent No.: US 12,502,025 B1
(45) Date of Patent: Dec. 23, 2025

(54) FOOD HEATING MAT AND PRODUCTION PROCESS THEREOF

(71) Applicant: Guocai Rao, Guangdong (CN)

(72) Inventor: Guocai Rao, Guangdong (CN)

( * ) Notice: Subject to any disclaimer, the term of this patent is extended or adjusted under 35 U.S.C. 154(b) by 0 days.

(21) Appl. No.: 18/942,355

(22) Filed: Nov. 8, 2024

(51) Int. Cl.
*A47J 36/24* (2006.01)

(52) U.S. Cl.
CPC .................................. *A47J 36/2483* (2013.01)

(58) Field of Classification Search
CPC ................................................... A47J 36/2483
See application file for complete search history.

(56) References Cited

U.S. PATENT DOCUMENTS

| | | | | |
|---|---|---|---|---|
| 2002/0183660 A1* | 12/2002 | Lindh | ................ | A61F 5/05825 607/96 |
| 2008/0064807 A1* | 3/2008 | Weidinger | .............. | A47J 36/04 427/430.1 |
| 2008/0182071 A1* | 7/2008 | Cheng | ................... | A47C 16/02 428/138 |
| 2008/0245784 A1* | 10/2008 | Lawrence | ................ | H05B 3/68 29/592.1 |
| 2010/0116818 A1* | 5/2010 | Gabbay | .................... | H05B 6/36 219/528 |
| 2011/0252813 A1* | 10/2011 | Veltrop | ............... | A47J 36/2483 62/255 |
| 2015/0335202 A1* | 11/2015 | Wisner | ................ | A47J 36/2483 392/346 |
| 2019/0137114 A1* | 5/2019 | Rao | ........................ | E04F 15/166 |
| 2020/0113378 A1* | 4/2020 | Song | ........................ | H05B 3/03 |
| 2020/0404750 A1* | 12/2020 | Acero Acero | ......... | H05B 6/062 |
| 2022/0117045 A1* | 4/2022 | Lindskog | ............... | H05B 3/345 |
| 2023/0028901 A1* | 1/2023 | Olson | ................. | A47J 36/2483 |
| 2024/0023750 A1* | 1/2024 | Ganahl | ................ | A47J 36/025 |

* cited by examiner

*Primary Examiner* — Elizabeth M Kerr
*Assistant Examiner* — Keith Brian Assante
(74) *Attorney, Agent, or Firm* — Hawaii Patent Services; Nathaniel K. Fedde; Kenton N. Fedde

(57) ABSTRACT

Disclosed are a food heating mat and a production process thereof. A silica gel plate provided with a first U-shaped groove is formed by heat press molding and vulcanization, a heating wire is pressed into the first U-shaped groove, a limiting section of the first U-shaped groove is capable of preventing the heating wire from easily detaching therefrom, and then glue is injected for fixing. The food heating mat is structurally simple and features a high yield rate despite of a simple production process.

12 Claims, 8 Drawing Sheets

FOOD HEATING MAT AND PRODUCTION PROCESS THEREOF

TECHNICAL FIELD

The present disclosure relates to the technical field of heating mats, and particularly relates to a food heating mat and a production process thereof.

BACKGROUND

A food heating mat is a utensil used to keep food warm, and is suitable for use in cold winter. The food heating mat is capable of keeping food warm for a long time, which can be put on a dining table during meals or be used to heat or keep warm food before having meals.

According to a basic structure of the food heating mat, a heating material is placed in the heating mat. Commonly used heating materials include heating wires and electric heating films. However, the electric heating films are seldom used due to a complex production process, low power, and susceptibility to degradation.

The heating wires currently used for the heating mats in the prior art are usually bare metal wires not coated with insulation layers. Such metal wires easily cause localized overheating during use, which might damage the heating mats. According to a production process of the prior art, a heating mat is usually formed by pressing with a mold after laying a heating wire between two layers of mat. Because heating wires are elastic, they are easily displaced during production, thereby resulting in a high defect rate.

Therefore, it is necessary to design a new structure and process for producing heating mats to enhance quality and performance of the heating mats, to simplify the production process, and to improve production efficiency and a yield rate.

The EU patent (Application No.: EP4216667A1) discloses a method for producing a heating mat and a heating mat produced thereby. The method includes the following steps: sewing an electric heating wire with a supply line onto a fabric to form a thin layer of heating mat, and gluing the thin layer of heating mat to another thin layer of heating mat; fixing the heating mat on a smooth and flat surface padding, spraying polyurethane onto the fabric until a trimming rope tape by attaching a decorative rope tape to the flat padding or fabric, removing the trimming rope from the tape, cutting off a polyurethane layer, separating the thin layer of heating mat, casting and turning from one side of a flat base; and spraying and casting polyurethane onto a turned thin layer of heating mat cast on one side, and cutting off any excess polyurethane beyond an edge defined by a trimming line.

During production, no defective products will be generated due to displacement of the heating wire, but the production efficiency is low, and the production process is cumbersome, such that it is not conducive to mass production.

SUMMARY

An objective of the present disclosure is to solve the technical problems of the prior art including localized overheating of heating mats, a complex production process, and a low yield rate.

To achieve the above purpose, the technical solution of the present disclosure is specifically implemented as follows: a food heating mat includes a silica gel plate formed by heat press molding and vulcanization. The silica gel plate has a front face and a back face, a continuous multi-U-shaped boss is formed on the back face of the silica gel plate, and a cross section of the continuous multi-U-shaped boss is trapezoidal. A first U-shaped groove for accommodating a heating wire is formed in the continuous multi-U-shaped boss, an upper part of the first U-shaped groove serves as a limiting section, and a lower part thereof serves as an accommodating section, where a width of the limiting section is smaller than that of the accommodating section to prevent the heating wire from detaching from the first U-shaped groove; a plurality of support columns for supporting the silica gel plate are further arranged on the back face thereof, and the support columns and the continuous multi-U-shaped boss are arranged in a staggered manner; the heating wire is placed in the first U-shaped groove, and silica gel is injected into the first U-shaped groove; the heating wire is fixed in the first U-shaped groove; and a second U-shaped groove for accommodating a light guide strip is formed in the silica gel plate in a way of surrounding the silica gel plate, the second U-shaped groove and the first U-shaped groove are structurally similar, the light guide strip is placed in the second U-shaped groove, and transparent silica gel is injected into the second U-shaped groove; a mounting part is arranged at an end of the silica gel plate, the mounting part is provided with a control assembly, the control assembly includes a PCB board, a light source is arranged on the PCB board, and the light source is arranged at an end of the light guide strip; and the heating wire is electrically connected to the PCB board.

According to the above structure, through the continuous multi-U-shaped boss, heat generated by the heating wire first heats the continuous multi-U-shaped boss, and then the continuous multi-U-shaped boss transfers heat to the silica gel plate, thus preventing localized overheating of the silica gel plate. Additionally, the heating wire can be directly pressed into the continuous multi-U-shaped boss, and due to obstruction by the limiting section, the heating wire is hardly detached from the first U-shaped groove, with high production efficiency.

A production process of a food heating mat further provided by the present disclosure includes the following steps:

S1, preparing sheet-type silica gel blank: preparing a mold through which the silica gel blank can be processed into the silica gel plate and a vulcanizing device; and installing the mold on the vulcanizing device.

S2, starting the vulcanizing device to open the mold and placing the silica gel blank into the mold;

S3, starting the vulcanizing device to heat and pressurize the silica gel to vulcanize it into a predetermined shape;

S4, starting the vulcanizing device to open the mold, and removing the silica gel plate, where the continuous multi-U-shaped boss with the first U-shaped the support the second U-shaped groove for installing the light guide strip, and the mounting part are formed on the silica gel plate;

S5, pressing the heating wire into the first U-shaped groove;

S6, injecting the silica gel into the first U-shaped groove to fix the heating wire on the silica gel plate;

S7, pressing the light guide strip into the second U-shaped groove;

S8, injecting the transparent silica gel into the second U-shaped groove to fix the light guide strip on the silica gel plate;

S9, installing the PCB board in the mounting part, and installing the temperature sensor in the first mounting hole;

S10, installing the upper housing and the lower housing in the mounting part; and S11, testing the food heating mat.

In the production process of the food heating mat, the silica gel plate is formed by heating and pressurizing the silica gel blank in the automatic plate vulcanizing machine, and the production process is simple; after molding, the first U-shaped groove is formed for placing the heating wire, the limiting section is arranged in the upper part of the first U-shaped groove, such that the heating wire is not easily detached from the first U-shaped groove after being placed, and during assembly, the heating wire is simply pressed into the first U-shaped groove, which significantly improves production efficiency and reduces a defect rate; and additionally, the second U-shaped groove is formed during the molding process for placing the light guide strip, and to assemble the light guide strip, the light guide strip can be simply pressed into the second U-shaped groove, which is simple. The light source is arranged at either end of the light guide strip, and light emitted from a light source is transferred to the second U-shaped groove through the light guide strip, which expands a light extraction range and increases an atmosphere during use of the heating mat.

Figure 1:
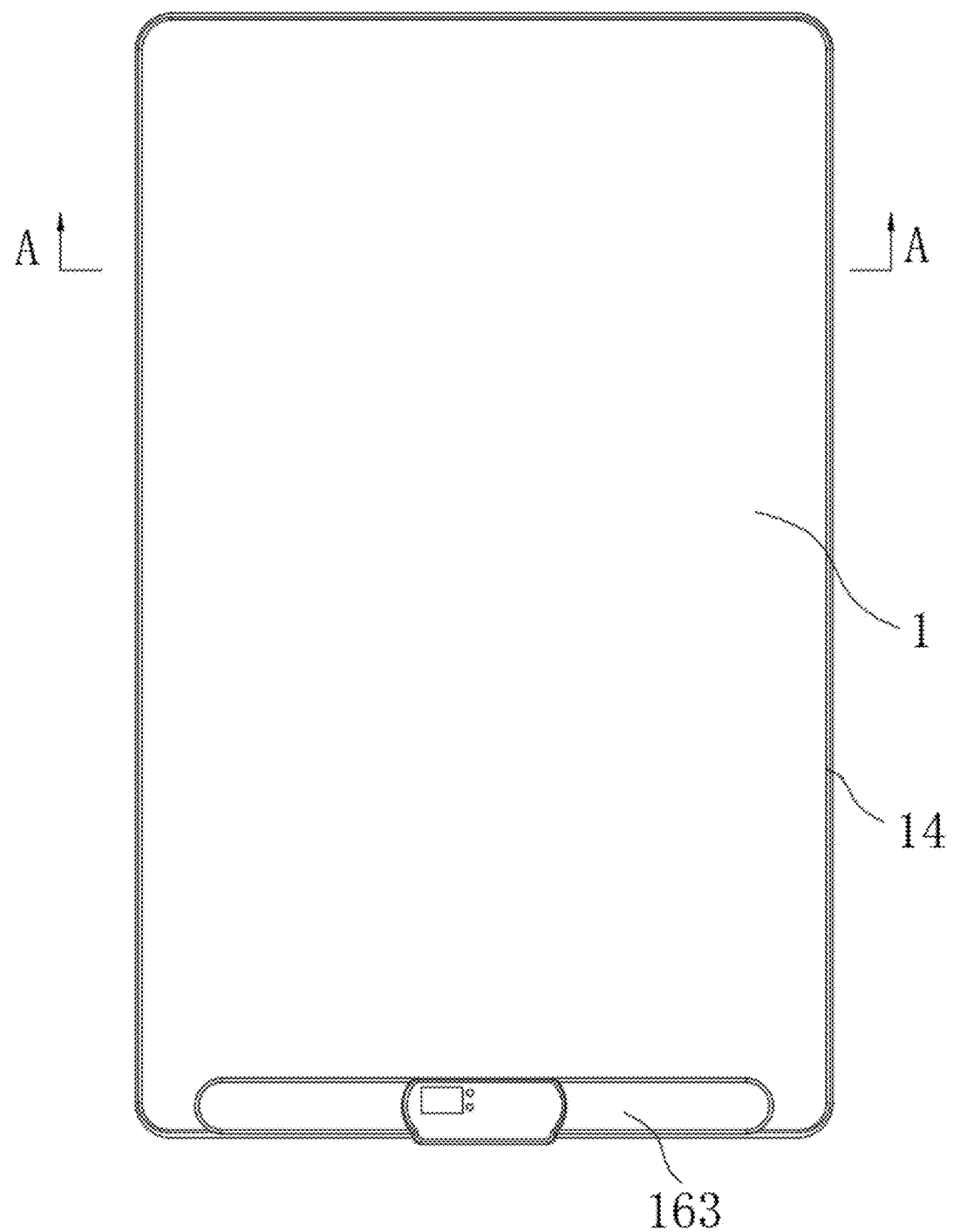
FIG. 1 is a front view of the present disclosure according to an example.

In the figures:
1. silica gel plate; 11. continuous multi-U-shaped boss; 111. first U-shaped boss; 112. second U-shaped boss; 113. third U-shaped boss; 12. first U-shaped groove; 121. limiting section; 122. accommodating section; 123. chamfer; 13. support column; 14. second U-shaped groove; 15. mounting part; 151. cavity; 152. substrate; 153. notch; 154. second flange; 16. control assembly; 161. PCB board; 162. light source; 163. upper housing; 164. lower housing; 17. first flange; 18. first mounting hole; 19. second mounting hole; 2. heating wire; 4. silica gel; 5. transparent silica gel;

1b. silica gel plate; 11b. supporting table; 12b. mounting part; 13b. limiting protrusion; 2b. heating wire; 3b. through hole; 4b. gluing hole; 5b. outer housing; and 6b. encapsulated housing.

DETAILED DESCRIPTIONS OF THE EMBODIMENTS

As illustrated in FIGS. 1-7, a food heating mat includes a silica gel plate 1 formed by heat press molding and vulcanization. The silica gel plate 1 has a front face and a back face, a continuous multi-U-shaped boss 11 is formed on the back face of the silica gel plate 1, and a cross section of the continuous multi-U-shaped boss 11 is trapezoidal. A first U-shaped groove 12 for accommodating a heating wire 2 is formed in the continuous multi-U-shaped boss 11, an upper part of the first U-shaped groove 12 serves as a limiting section 121, a lower part thereof serves as an accommodating section 122, where a width of the limiting section 121 is smaller than that of the accommodating section 122 to prevent the heating wire 2 from detaching from the first U-shaped groove 12, and the limiting section 121 is provided with a chamfer 123 that facilitates entry of the heating wire 2. A plurality of support columns 13 for supporting the silica gel plate 1 are further arranged on the back face thereof, and the plurality of support columns 13 allow for a smaller contact area between a back face of the heating mat and a table, such that less heat emitted by the heating mat is transferred to the table, thereby preventing damage to a top of the table due to excessive heat. The support columns 13 and the continuous multi-U-shaped boss 11 are arranged in a staggered manner.

In this example, the heating wire 2 is placed in the first U-shaped groove 12, the heating wire 2 is a metal heating wire coated with a heat-resistant silica gel layer, and coating with the heat-resistant silica gel layer prevents localized overheating of the heating wire 2 when being electrified, thereby avoiding damage to the silica gel plate 1. Silica gel 4 is injected into the first U-shaped groove 12, and through injection of the silica gel 4, the heating wire 2 is further fixed in the first U-shaped groove 12, which facilitates heat transfer.

A second U-shaped groove 14 for accommodating a light guide strip 3 is formed in the silica gel plate 1 in a way of surrounding the silica gel plate 1. In this example, the second U-shaped groove 14 is formed on the front face of the silica gel plate 1, and alternatively, the second U-shaped groove 14 can be formed on a side face or the back face of the silica gel plate 1.

In this example, the second U-shaped groove 14 is offset towards a center by a certain distance along the side face of the silica gel plate 1, and a distance of the offset is 5-8 mm.

The second U-shaped groove 14 and the first U-shaped groove 12 are structurally similar, the light guide strip 3 is placed in the second U-shaped groove 14, and transparent silica gel 5 is injected into the second U-shaped groove 14, such that when the light guide strip 3 is fixed in the second U-shaped groove 14, light emitted by the light guide strip 3 is not blocked out.

In this example, a mounting part 15 is arranged at an end of the silica gel plate 1, the mounting part 15 is provided with a control assembly 16, the control assembly 16 includes a PCB board 161, a light source 162 is arranged on the PCB board 161, the light source 162 is arranged at an end of the light guide strip 3, the light source 162 is arranged at either end of the light guide strip 3, and direct light from the light sources 162 at both ends improves a luminous effect of the entire light guide strip 3; the heating wire 2 is electrically connected to the PCB board 161; and the PCB board 161 enables switch control of both the light source 162 and the heating wire 2.

Figure 2:
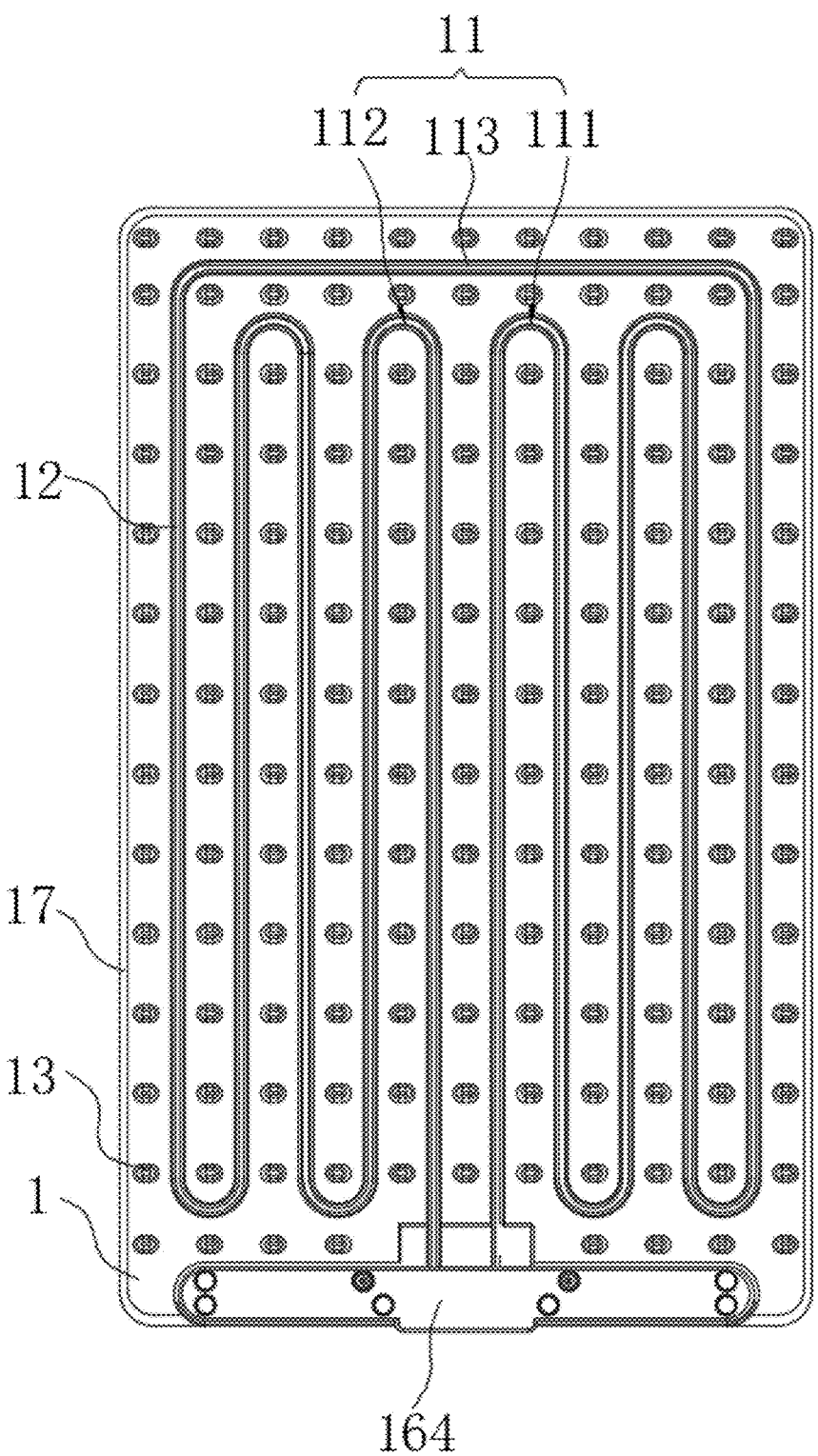
FIG. 2 is a rear view of the present disclosure according to an example.

As illustrated in FIG. 2, in this example, a first flange 17 is arranged on a bottom face of the silica gel plate 1 in a way of surrounding a side edge of the silica gel plate 1 by one circle, and the continuous multi-U-shaped boss 11, the support columns 13, and the first flange 17 are integrally formed together with the silica gel plate 1 through heating and pressurizing in a vulcanizing device, which simplifies a production process of the heating mat and enhancing production efficiency of the heating mat.

According to the above structure, the first U-shaped groove 12 is formed to press the heating wire 2 into the first U-shaped groove 12, such that the heating wire 2 does not easily shift during production, and the limiting section 121 of the first U-shaped groove 12 effectively restricts the heating wire 2 in the first U-shaped groove 12; and the second U-shaped groove 14 is arranged on the front face of the silica gel plate 1, the light guide strip 3 is installed in the second U-shaped groove 14, and direct light from the light sources 162 at both ends of the light guide strip 3 enables the light guide strip 3 to shine, which further enhances a decorative effort of the heating mat and increases an atmosphere during use of the heating mat.

In this example, the continuous multi-U-shaped boss 11 includes a first U-shaped boss 111, a second U-shaped boss 112, and a third U-shaped boss 113, where the third U-shaped boss 113 partially surrounds the first U-shaped boss 111 and the second U-shaped boss 112; one end of the first U-shaped boss 111 is communicated with the mounting part 15; and one end of the second U-shaped boss 112 is communicated with the mounting part 15, both ends of the third U-shaped boss 113 are communicated with the other end of the first U-shaped boss 111 and the other end of the second U-shaped boss 112, respectively.

The PCB board 161 further includes a temperature sensor, an over-temperature protector, a controller, and a power socket.

Figure 4:
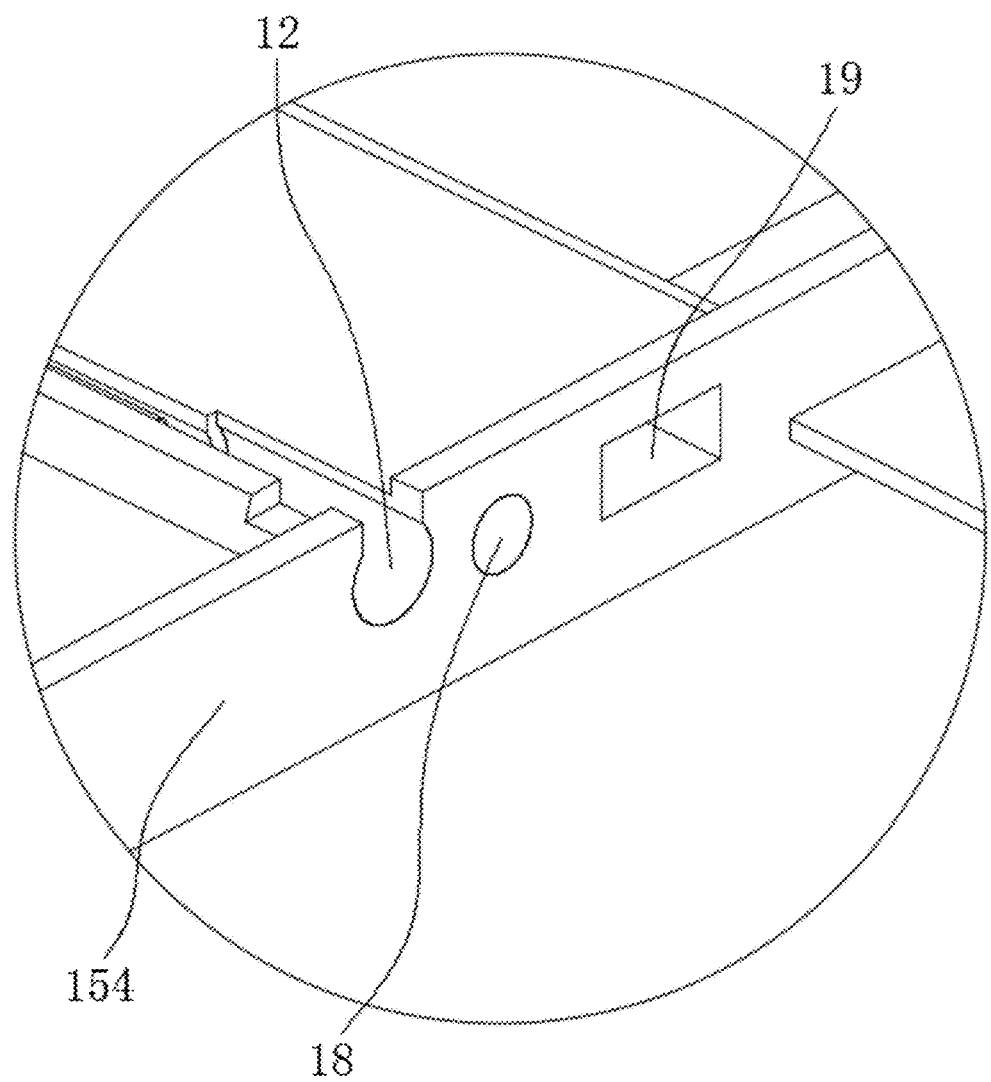
FIG. 4 is an enlarged view of B in FIG. 3.
Figure 5:
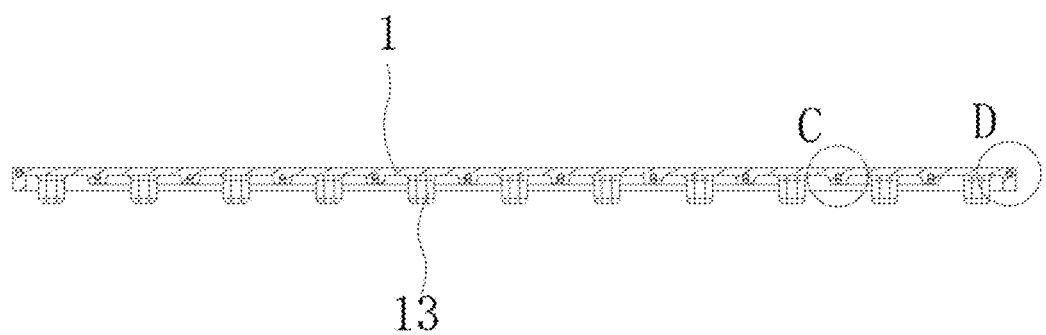
FIG. 5 is a sectional view of A-A in FIG. 1.
Figure 6:
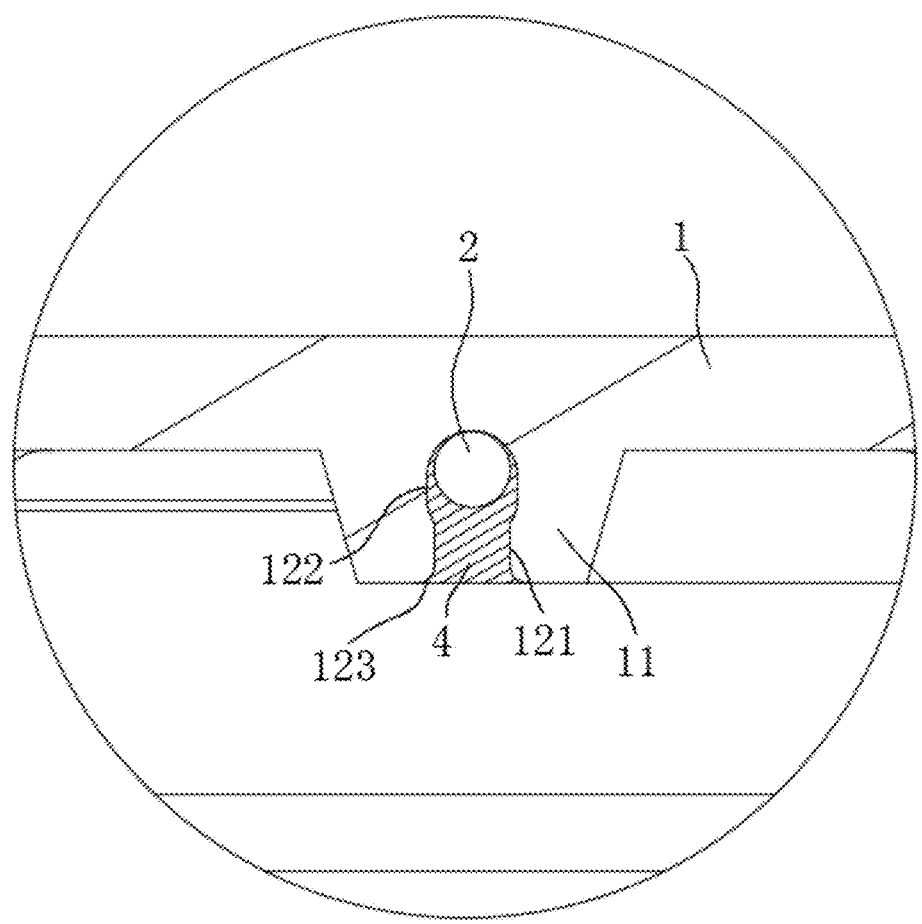
FIG. 6 is an enlarged view of C in FIG. 5.
Figure 7:
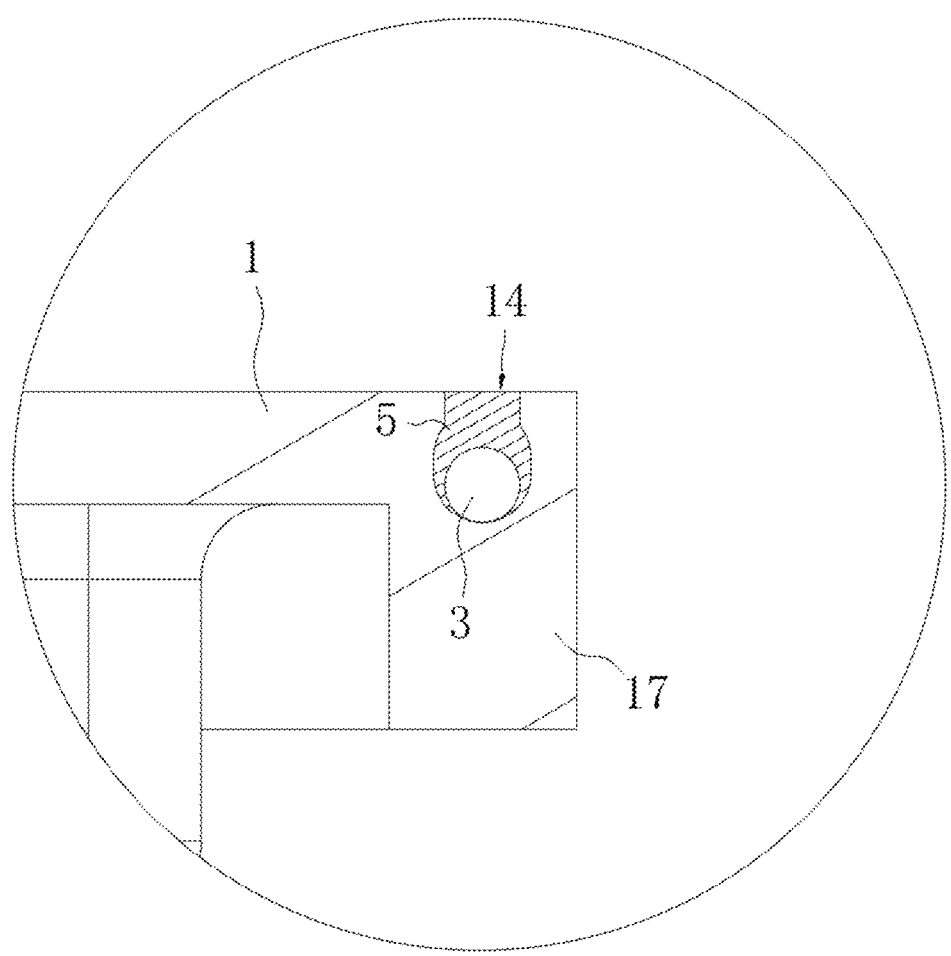
FIG. 7 is an enlarged view of D in FIG. 5.

As illustrated in FIG. 4, in this example, a first mounting hole 18 for installing the temperature sensor and a second mounting hole 19 for installing the over-temperature protector are formed on a side of the silica gel plate 1 close to the control assembly 16 in a length direction of the silica gel plate 1, both the first mounting hole 18 and the second mounting hole 19 are close to the first U-shaped boss 111, and the second mounting hole 19 is located next to the first mounting hole 18; and the temperature sensor extends into the silica gel plate 1 through the first mounting hole 18 to detect a temperature of the silica gel plate 1. The over-temperature protector extends into the silica gel plate 1 through the second mounting hole 19, and when the temperature of the silica gel plate 1 exceeds a set threshold, the over-temperature protector will cut off a power supply for the heating wire 2.

Figure 3:
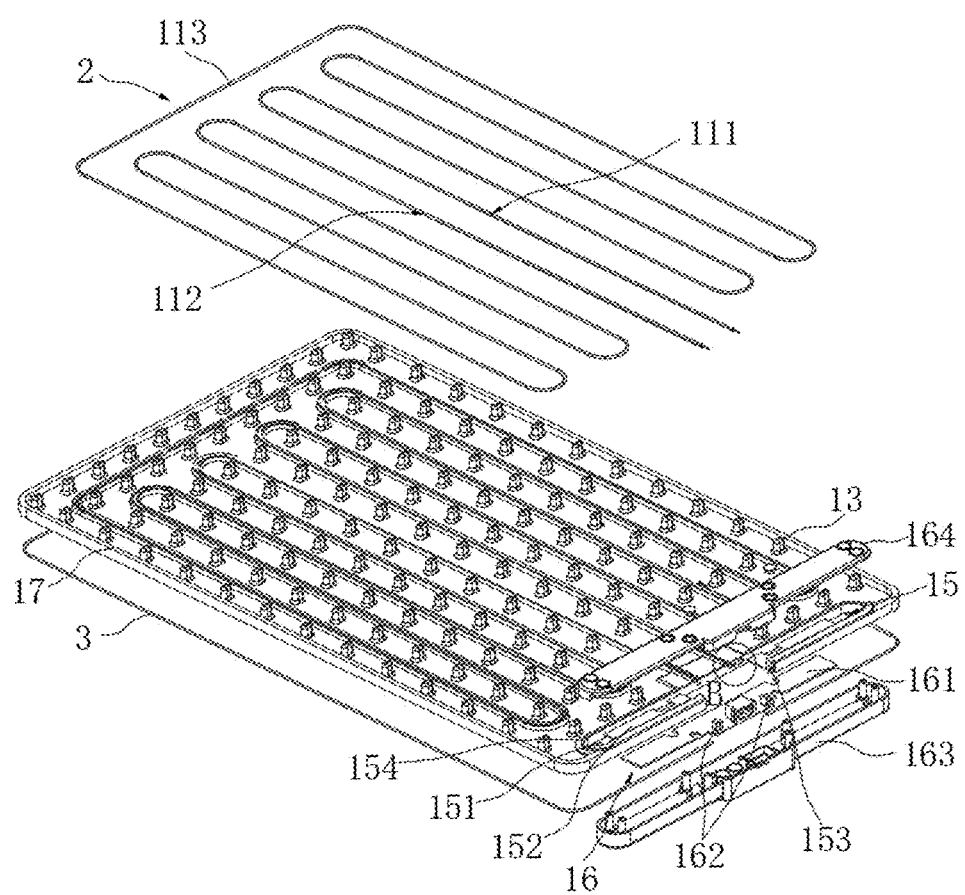
FIG. 3 is a schematic diagram of a breakdown structure according to an example of the present disclosure.

As illustrated in FIG. 3, in this example, a cavity 151 of a long strip shape is formed in the mounting part 15, the cavity 151 is configured for installing the control assembly 16, a substrate 152 for positioning the PCB board 161 is arranged in the cavity 151, and through the substrate 152, the PCB board 161 can be quickly and accurately positioned during installation.

A notch 153 for installing the power socket is further formed in the mounting part 15; second flanges 154 are arranged on both sides of the cavity 151; the control assembly 16 further includes an upper housing 163 and a lower housing 164, both the upper housing 163 and the lower housing 164 are positioned through the second flanges 154, and in this example, the upper housing 163 and the lower housing 164 are fastened with screws; and the control assembly 16 is wrapped by the upper housing 163 and the lower housing 164 to protect the control assembly 16 from damage.

A production process of a food heating mat provided by the present disclosure includes the following steps:

S1, prepare sheet-type silica gel blank: prepare a mold through which the silica gel blank can be processed into the silica gel plate 1 and a vulcanizing device; and install the mold on the vulcanizing device.

In this example, the silica gel blank is prepared as follows: a food-grade mixed silica gel sheet is selected and rolled into a continuous sheet after adding a color masterbatch and a vulcanizing agent, and then cut to obtain silica gel blank of a suitable size; and the vulcanizing device is an automatic plate vulcanizing machine.

S2, start the automatic plate vulcanizing machine to open the mold and place the silica gel blank into the mold.

S3, start the automatic plate vulcanizing machine to heat and pressurize the silica gel blank to vulcanize it into a predetermined shape, where in this example, a heating temperature is 160° C., a pressurization pressure is 20 MPa, and pressurization time is 110 s.

S4, start the automatic plate vulcanizing machine to open the mold, remove the silica gel plate 1, before removing the silica gel plate 1, and use an air gun to blow up the silica gel plate 1 to prevent the silica gel plate 1 from incomplete molding, where the silica gel plate 1 is easily deformed when it is removed directly by hand; after removing the silica gel plate 1, perform edge deburring treatment on the silica gel plate 1 to make the silica gel plate 1 have a smoother surface; and form the continuous multi-U-shaped boss 11, the first U-shaped groove 12, the support columns 13, the second U-shaped groove 14, and the mounting part 15 on the silica gel plate 1.

S5, press the heating wire 2 into the first U-shaped groove 12, to limit displacement of the heating wire 2 through the first U-shaped groove 12.

S6, inject the silica gel 4 into the first U-shaped groove 12 to fix the heating wire 2 on the silica gel plate 1.

S7, press the light guide strip 3 into the second U-shaped groove 14.

S8, inject the transparent silica gel 5 into the second U-shaped groove 14 to fix the light guide strip 3 on the silica gel plate 1.

S9, install the PCB board 161 in the mounting part 15, and electrically connect the heating wire 2 to the PCB board 161 through a connecting terminal; install the temperature sensor in the first mounting hole 18, install the over-temperature protector in the second mounting hole 19, and electrically connect the temperature sensor and the over-temperature protector to the PCB board 161 through the connecting terminal.

S10, install the upper housing 163 and the lower housing 164 in the mounting part 15 to protect the control assembly 16.

S11, test the food heating mat, specifically: test whether the controller is capable of normally adjusting heating temperatures and heating time and whether the entire device can be electrified normally.

In the production process of the food heating mat, the silica gel plate is formed by heating and pressurizing the silica gel blank in the automatic plate vulcanizing machine, and the production process is simple; after molding, the first U-shaped groove 12 is formed for placing the heating wire 2, the limiting section 121 is arranged in the upper part of the first U-shaped groove 12, such that the heating wire is not easily detached from the first U-shaped groove 12 after being placed, and during assembly, the heating wire 2 is simply pressed into the first U-shaped groove 12, which significantly improves production efficiency and reduces a defect rate; and additionally, the second U-shaped groove 14 is formed during the molding process for placing the light guide strip 3, and to assemble the light guide strip 3, the light guide strip 3 can be simply pressed into the second U-shaped groove 14, which is simple.

Figure 8:
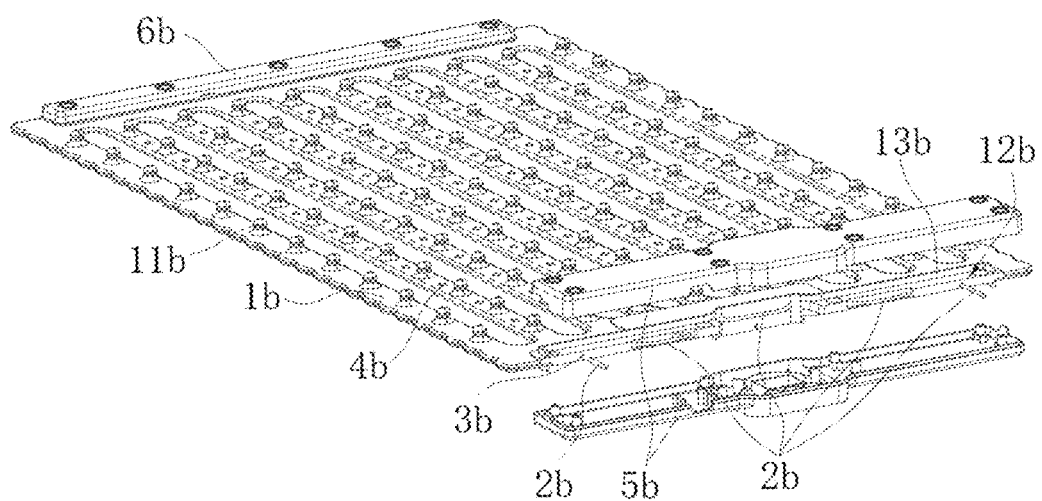
FIG. 8 is a schematic diagram of an overall structure according to another example of the present disclosure.
Figure 9:
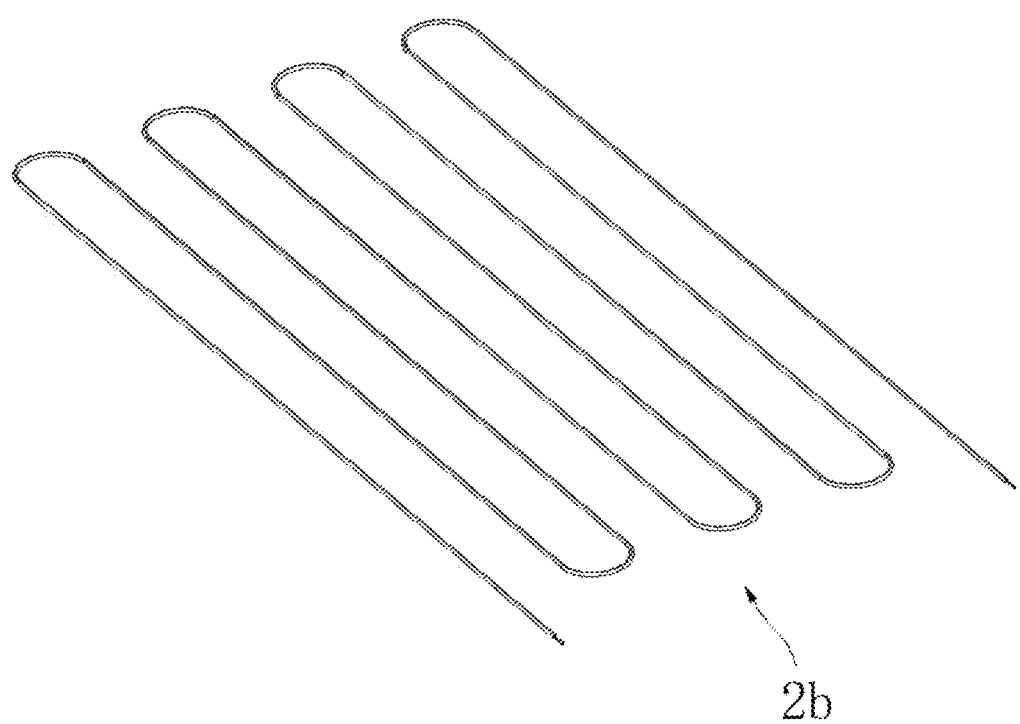
FIG. 9 is a schematic diagram of threading of a heating wire according to another example of the present disclosure.
Figure 10:
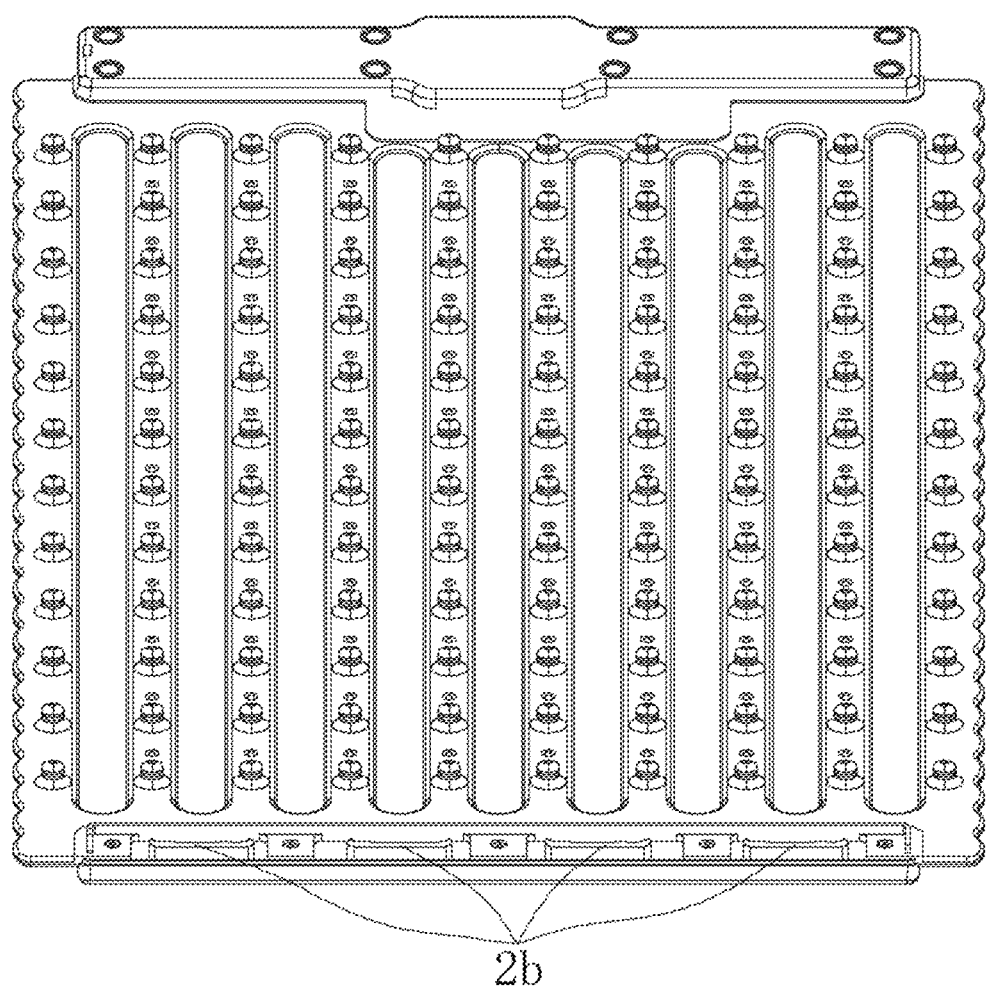
FIG. 10 is a schematic structural diagram of another view according to another example of the present disclosure.

As illustrated in FIGS. 8-10, the present disclosure further provides another food heating mat, and the food heating mat includes a silica gel plate 1b, where a plurality of supporting tables 11b are formed on a back face of the silica gel plate 1b, the plurality of supporting tables 11b are arranged in an array, and gluing holes 4b are formed between the supporting tables 11b in a longitudinal direction; and a plurality of through holes 3b are formed in a longitudinal direction of the silica gel plate 1b, the through holes 3b are configured for threading the heating wire 2b, and the gluing holes 4b are communicated with the through holes 3b.

As illustrated in FIGS. 8-10, the heating wire 2b is threaded through the through holes 3b to take on a continuous multi-U shape in the silica gel plate 1b, glue is injected into the gluing holes 4b to fix the heating wire 2b in the through holes 3b, and at the same time, the gluing holes 4b are sealed.

A mounting part 12b for installing the control assembly is arranged at an end of the silica gel plate 1b, the mounting part 12b is provided with a limiting protrusion 13b to limit an installation position of the control assembly on the silica gel plate 1b, and a plastic housing 5b is installed on the mounting part 12b to protect the control assembly from external damage; and an encapsulated housing 6b is installed at an end of the silica gel plate 1b opposite to the mounting part 12b to protect the through holes 3b from exposure and protect the heating wire 2b that passes through the through holes 3b.

A production process of the food heating mat in this example includes the following steps:

S1, prepare sheet-type silica gel blank: prepare a mold through which the silica gel blank can be processed into the silica gel plate 1b and an automatic plate vulcanizing machine; and prepare a metal strip.

S2, start the automatic plate vulcanizing machine to open the mold and place the metal strip at a predetermined position of the mold; and place the silica gel blank in the mold.

S3, start the automatic plate vulcanizing machine to heat and pressurize the silica gel blank to vulcanize it into a predetermined shape.

S4, start the automatic plate vulcanizing machine to open the mold and extract the metal strip from the silica gel plate 1b, to obtain the through holes 3b for threading the heating wire 2b, where during the molding of the silica gel plate 1b, the gluing holes 4b are formed at a bottom of the silica gel plate 1b, and a groove for installing a light-emitting assembly is formed in a side portion of the silica gel plate 1b.

S5, thread the heating wire 2b into the through holes 3b.

S6, drop glue at the gluing holes 4b to fix the heating wire 2b on the silica gel plate 1b.

S7, install the light-emitting assembly in the groove; install the controller, the temperature sensor and the over-temperature protector on the silica gel plate 1b and establish electrical connections; and install the plastic housing 5b and the encapsulated housing 6b on the silica gel plate 1b.

S8, test the food heating mat.

The production process is used to manufacture the food heating mat, which is simple, but features high production efficiency and a high yield rate.

What is claimed is:

1. A food heating mat, comprising a silica gel plate formed by heat press molding and vulcanization, wherein the silica gel plate has a front face and a back face, a continuous multi-U-shaped boss is formed on the back face of the silica gel plate, and a cross section of the continuous multi-U-shaped boss is trapezoidal;
    a first U-shaped groove for accommodating a heating wire is formed in the continuous multi-U-shaped boss, an upper part of the first U-shaped groove serves as a limiting section, and a lower part thereof serves as an accommodating section, wherein a width of the limiting section is smaller than that of the accommodating section to prevent the heating wire from detaching from the first U-shaped groove;
    a plurality of support columns for supporting the silica gel plate are further arranged on the back face thereof, and the plurality of support columns and the continuous multi-U-shaped boss are arranged in a staggered manner;
    the heating wire is placed in the first U-shaped groove, and silica gel is injected into the first U-shaped groove;
    a second U-shaped groove for accommodating a light guide strip is formed in the silica gel plate in a way of surrounding the silica gel plate, the second U-shaped groove and the first U-shaped groove are structurally similar, the light guide strip is placed in the second U-shaped groove, and transparent silica gel is injected into the second U-shaped groove; and
    a mounting part is arranged at an end of the silica gel plate, the mounting part is provided with a control assembly, the control assembly comprises a PCB board, a light source is arranged on the PCB board, and the light source is arranged at an end of the light guide strip; and the heating wire is electrically connected to the PCB board.

2. The food heating mat according to claim 1, wherein a first flange is arranged on a bottom face of the silica gel plate in a way of surrounding a side edge of the silica gel plate by one circle.

3. The food heating mat according to claim 2, wherein the continuous multi-U-shaped boss, the support columns, and the first flange are integrally formed.

4. The food heating mat according to claim 1, wherein the continuous multi-U-shaped boss comprises a first U-shaped boss, a second U-shaped boss, and a third U-shaped boss, wherein the third U-shaped boss partially surrounds the first U-shaped boss and the second U-shaped boss; and
    one end of the first U-shaped boss is communicated with the mounting part; and one end of the second U-shaped boss is communicated with the mounting part, both ends of the third U-shaped boss are communicated with another end of the first U-shaped boss and another end of the second U-shaped boss, respectively.

5. The food heating mat according to claim 1, wherein the limiting section is provided with a chamfer that facilitates entry of the heating wire.

6. The food heating mat according to claim 1, wherein the second U-shaped groove is formed on the front face of the silica gel plate; and the second U-shaped groove is offset towards a center by a certain distance along a side face of the silica gel plate.

7. The food heating mat according to claim 1, wherein a first mounting hole and a second mounting hole are formed on a side of the silica gel plate in a length direction of the silica gel plate.

8. The food heating mat according to claim 1, wherein the light source is arranged at either end of the light guide strip.

9. The food heating mat according to claim 1, wherein the heating wire is a metal heating wire coated with a heat-resistant silica gel layer.

10. The food heating mat according to claim 1, wherein a cavity of a long strip shape is formed in the mounting part, a substrate for positioning the PCB board is arranged in the cavity, and a notch for installing a power socket is further formed in the mounting part; and second flanges are arranged on both sides of the cavity.

11. The food heating mat according to claim 10, wherein the control assembly further comprises an upper housing and a lower housing, both the upper housing and the lower housing are positioned through the second flanges, and the upper housing and the lower housing are fastened with screws.

12. The food heating mat according to claim 1, wherein the PCB board further comprises a temperature sensor, an over-temperature protector, a controller, and a power socket.

\* \* \* \* \*